US006260752B1

(12) United States Patent
Dollesin

(10) Patent No.: US 6,260,752 B1
(45) Date of Patent: *Jul. 17, 2001

(54) EXTERNAL EQUIPMENT CARRIER WITH CARGO HOLDER FOR VEHICLE

(76) Inventor: Emil Dollesin, 618 Excelsior Ave., San Francisco, CA (US) 94112

( * ) Notice: Subject to any disclaimer, the term of this patent is extended or adjusted under 35 U.S.C. 154(b) by 0 days.

This patent is subject to a terminal disclaimer.

(21) Appl. No.: 09/328,542

(22) Filed: Jun. 9, 1999

Related U.S. Application Data

(63) Continuation-in-part of application No. 09/111,239, filed on Jul. 7, 1998, now Pat. No. 6,105,843.
(60) Provisional application No. 60/129,815, filed on Apr. 16, 1999, and provisional application No. 60/123,509, filed on Mar. 8, 1999.
(51) Int. Cl.$^7$ .......................................................... B60R 9/06
(52) U.S. Cl. ............................ 224/524; 224/495; 224/509
(58) Field of Search ..................................... 224/488, 509, 224/522–527, 528, 529, 530, 495; 108/44; 414/462

(56) References Cited

U.S. PATENT DOCUMENTS

| 1,817,056 | * | 8/1931 | Belgard ............................ 224/526 X |
| 4,400,129 | | 8/1983 | Eisenberg et al. . |
| 4,695,218 | | 9/1987 | Boyer . |
| 4,744,590 | * | 5/1988 | Chesney .......................... 224/526 X |
| 4,844,528 | | 7/1989 | Johnson . |
| 5,011,361 | | 4/1991 | Peterson . |
| 5,033,662 | * | 7/1991 | Godin .............................. 224/526 X |
| 5,038,983 | | 8/1991 | Tomososki . |
| 5,090,335 | * | 2/1992 | Russel ..................................... 108/44 |
| 5,114,120 | | 5/1992 | Bartelt et al. . |
| 5,433,357 | * | 7/1995 | Alliff ................................ 224/526 X |
| 5,456,564 | | 10/1995 | Bianchini . |
| 5,664,717 | | 9/1997 | Joder . |
| 5,765,868 | * | 6/1998 | Ventrone et al. ................. 224/526 X |
| 5,799,962 | * | 9/1998 | Barnhart ............................. 108/44 X |
| 6,105,843 | * | 8/2000 | Dollesin ............................... 224/509 |

FOREIGN PATENT DOCUMENTS

2142587 * 1/1985 (GB) .................................... 224/527

OTHER PUBLICATIONS

Brochure for "Piggyback Pod" cargo box by USA Ventur-Craft Corp. 2 sheets, No Date Given.

P. 28 of the Apr. 1998 issue of Truck Trend magazine showing the "Duratrunk", the "Piggyback Pod", and the "DOTX" cargo boxes.

* cited by examiner

Primary Examiner—Gregory M. Vidovich
(74) Attorney, Agent, or Firm—Jack Lo

(57) ABSTRACT

An external equipment carrier with a cargo holder includes an arm with a front end for being attached to a trailer hitch on a vehicle. A manual scissors jack and a vertical guide rail are connected to the back of the arm. The top of the jack is slidable along the guide rail. A cargo holder is removably carried on a support bar at the top of the jack, and can be raised or lowered by operating the jack. The arm is articulated for retracting the cargo holder to a stowed position behind the vehicle, and pivoting the cargo holder to an extended position away from the tailgate or rear door of the vehicle. The cargo holder includes retractable legs with wheels. In another embodiment, the cargo holder is supported on a foldable platform attached to the top of the jack. In another embodiment, the jack is comprised of a screw jack connected to a rear end of a hinged arm with a front end for being attached to a trailer hitch. The arm is hinged about a transverse axis, so that the jack can be lowered to allow the opening of a rear door on the vehicle. In another embodiment, the cargo holder is comprised of a platform with a hook to connect to the support member on the equipment carrier.

1 Claim, 8 Drawing Sheets

Fig. 1

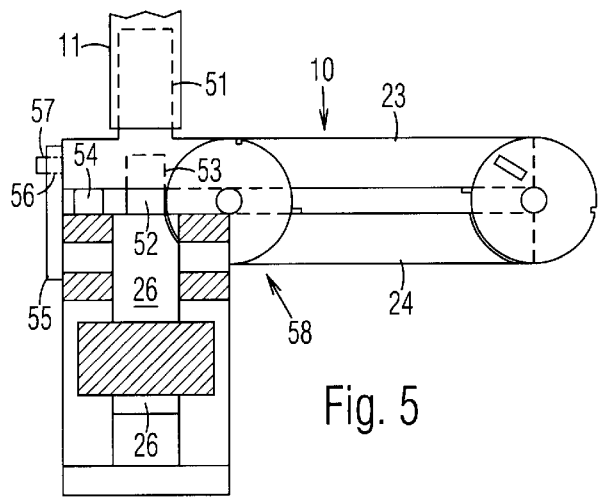
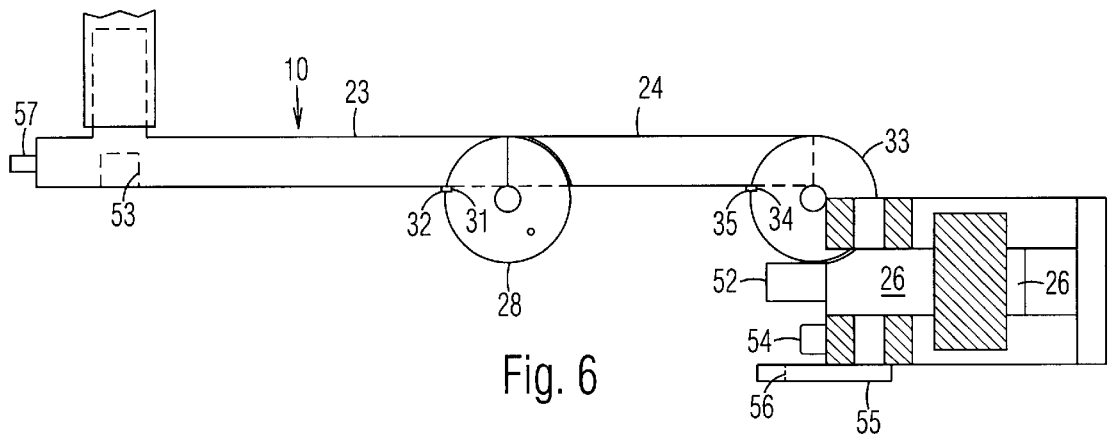

EXTERNAL EQUIPMENT CARRIER WITH CARGO HOLDER FOR VEHICLE

CROSS REFERENCE TO RELATED APPLICATIONS

This is a continuation-in-part of application Ser. No. 09/111,239, filed Jul. 7, 1998, which has matured into U.S. Pat. No. 6,105,843. The benefit of provisional application Ser. Nos. 60/123,509, filed Mar. 8, 1999, and 60/129,815, filed Apr. 16, 1999, is claimed.

BACKGROUND OF THE INVENTION

1. Field Of The Invention

This invention relates generally to carriers for supporting equipment externally on a vehicle.

2. Prior Art

Equipment too large for being carried inside a vehicle, such as wheelchairs, bicycles, and cargo holders, may be supported on carriers attached to the rear of the vehicle. Some carriers are bolted directly to the vehicle, and others are attached to a conventional trailer hitch.

U.S. Pat. No. 5,664,717 to Joder shows an equipment carrier including a horizontal arm with a proximal end for being attached to a trailer hitch on a vehicle. The arm is articulated at two positions for pivoting away from the vehicle's tailgate or backdoor. It is specifically made for carrying bicycles, which must be manually lifted onto the carrier. U.S. Pat. No. 5,456,564 to Bianchini shows an equipment carrier with a platform connected by hinged arms that move through an arc. The arms deploy to a position far behind the vehicle, so that they cannot be deployed when the vehicle is parked closely in front of another vehicle. The arms are retracted to an almost vertical position, so that the carrier is not suitable for carrying a cargo holder, because the cargo holder would be lifted so high that it would block the rear window of the vehicle. Further, it requires a powerful electric winch, which is very expensive. U.S. Pat. No. 5,114,120 to Bartelt et al. shows another equipment carrier with an articulated arm. U.S. Pat. No. 5,038,983 to Tomososki shows a cargo holder and carrier for attaching to a trailer hitch. The cargo holder cannot be removed from the carrier. U.S. Pat. No. 5,011,361 to Peterson shows an equipment carrier with an electric screw actuator, which is powerful but very expensive. U.S. Pat. No. 4,844,528 to Johnson shows a rear mounted cargo holder for vehicles. It includes four retractable legs with wheels on the lower ends. The legs are individually operated, so that they are easily set to incorrect lengths by mistake, especially over uneven ground. U.S. Pat. No. 4,695,218 to Boyer shows another equipment carrier with an expensive screw actuator. U.S. Pat. No. 4,400,129 to Eisenberg et al. shows an equipment carrier with a spring-loaded pivoting arm which is limited to relatively light loads. Equipment carriers sold under the trademark "PIGGYBACK" by VenturCraft, and "DOTX" by Dotronix are cargo holders mounted on articulated arms, but they must be manually lifted onto and off the arms. Once removed from the arms, the cargo holders must be carried by hand. Because prior art equipment carriers protrude far behind the vehicle, the driver cannot accurately judge the clearance behind them when backing up, so that they can be easily damaged.

OBJECTS OF THE INVENTION

Accordingly, objects of the external equipment carrier with a cargo holder for a vehicle are:

- to carry a large and heavy cargo holder outside a vehicle;
- to provide a collapsible cargo holder;
- to lower and raise the cargo holder very easily on and off the ground;
- to lower and raise the cargo holder with or without electrical power;
- to support the cargo holder in position without a locking or braking system;
- to be pivotable away from the rear of the vehicle to avoid blocking the tailgate or rear door;
- to enable a driver to see behind and below the cargo holder when backing up;
- to be compact, so that no extra space is needed for loading and unloading the equipment when the vehicle is parked in front of another vehicle;
- to enable the cargo holder to be easily transported once it is on the ground; and
- to be inexpensive.

Further objects of the present invention will become apparent from a consideration of the drawings and ensuing description.

BRIEF SUMMARY OF THE INVENTION

An external equipment carrier with a cargo holder includes an arm with a front end for being attached to a trailer hitch on a vehicle. A manual scissors jack and a vertical guide rail are connected to the back of the arm. The top of the jack is slidable along the guide rail. A cargo holder is removably carried on a support bar at the top of the jack, and can be raised or lowered by operating the jack. The arm is articulated for retracting the cargo holder to a stowed position behind the vehicle, and pivoting the cargo holder to an extended position away from the tailgate or rear door of the vehicle. The cargo holder includes retractable legs with wheels. In another embodiment, the cargo holder is supported on a foldable platform attached to the top of the jack. In another embodiment, the jack is comprised of a screw jack connected to a rear end of a hinged arm with a front end for being attached to a trailer hitch. The arm is hinged about a transverse axis, so that the jack can be lowered to allow the opening of a rear door on the vehicle. In another embodiment, the cargo holder is comprised of a platform with a hook to connect to the support member on the equipment carrier.

BRIEF DESCRIPTION OF THE SEVERAL VIEWS OF THE DRAWING

FIG. 5 is a top view of an articulated arm of the equipment carrier, taken along line 5—5 in FIG. 1, in a stowed position.

FIG. 6 is a top view of the articulated arm in an extended position.

DRAWING REFERENCE NUMERALS

| | |
|---|---|
| 10. Arm | 11. Trailer Hitch |
| 12. Vehicle | 13. Guide Rail |
| 14. Scissors Jack | 15. Link Arms |
| 16. Slots | 17. Top Support Member |
| 18. Bottom Support Bar | 19. Mirrors |
| 20. Brake Lights | 21. Extendable Arm |
| 22. Post | 23. First Section |
| 24. Middle Section | 25. Hinge |
| 26. End Section | 27. Hinge |
| 28. Disc | 29. Disc |
| 30. T-Bolt | 31. Notch |
| 32. Latch | 33. Disc |
| 34. Notch | 35. Latch |
| 36. Cargo Holder | 37. Guide Bars |
| 38. Top Mounting Brackets | 39. Bottom Mounting Bracket |
| 40. Legs | 41. Brackets |
| 42. Pin | 43. Holes |
| 44. Wheels | 45. Lamps |
| 46. Recessed Channels | 47. Sensor Switch |
| 48. Sensor Switch | 49. Battery |
| 50. Power Switch | 51. Connecting Member |
| 52. Key | 53. Hole |
| 54. Rubber Bumper | 55. Tab |
| 56. Slot | 57. Pin |
| 58. Equiptment Carrier | 59. Socket |
| 60. Rollers | 61. Bracket |
| 62. Equiptment Carrier | 63. Vertical Member |
| 64. Support Platform | 65. Cargo Holder |
| 66. Brake Lights | 67. Hook |
| 68. Pin | 69. Equiptment Carrier |
| 70. Arm | 71. Screw Jack |
| 72. Runner | 73. Support Member |
| 74. Screw Shaft | 75. Hole |
| 76. Motor | 77. Platform |
| 78. Connector | 79. Folding Legs |
| 80. Casters | |
| 96. Pivot | 97. Brackets |
| 98. Rear of Arm | 99. Latch |

DETAILED DESCRIPTION OF THE INVENTION

Figure 1:
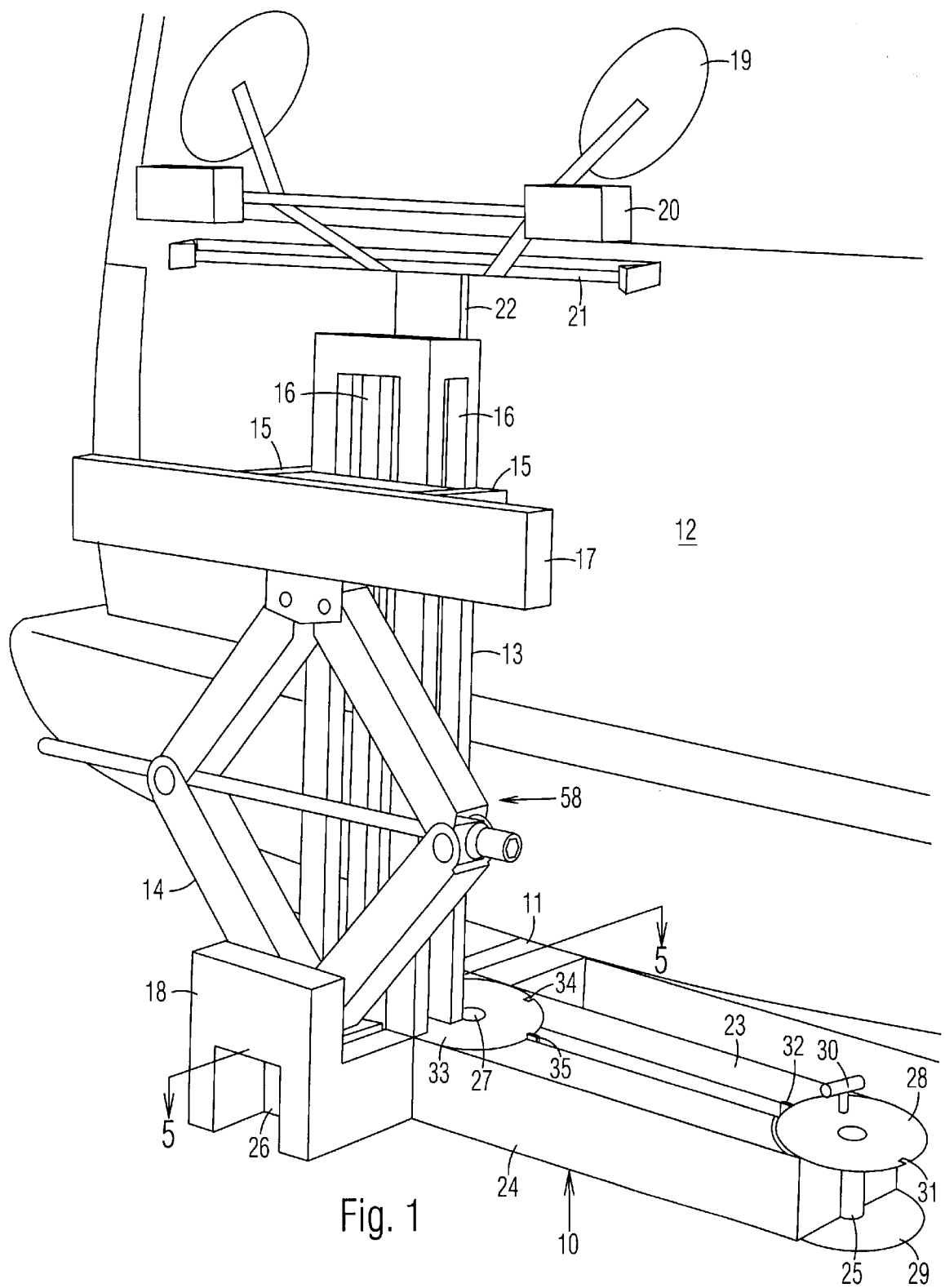
FIG. 1 is a rear perspective view of the present equipment carrier.

FIG. 1:

A first embodiment of an external equipment carrier 58 for a vehicle 12 is shown in a rear perspective view in FIG. 1. It includes an articulated arm 10 with a rear end for being connected to a conventional trailer hitch 11 of vehicle 12. A vertical guide rail 13 is connected near a front end of arm 10. A scissors jack 14 has a lower end connected to the rear end of arm 10 behind guide rail 13. A pair of link arms 15 extending forwardly from the top end of jack 14 are movably connected to slots 16 on the sides of guide rail 13. A horizontal top support member 17 is connected to the top of jack 14. A bottom support member 18 is connected to the distal end of arm 10 behind jack 14. A pair of mirrors 19 and brake lights 20 are connected to an extendable arm 21, which is connected to a post 22 slidable vertically on guide rail 13. Brake lights 20 are for being connected to the vehicle's braking system in a conventional manner well known in the art. Arm 21 is shown in a fully retracted position.

Arm 10 is shown in a retracted or stowed position. It includes a fixed first section 23 hinged to a pivotable middle section 24 by a hinge 25. Middle section 24 is hinged to an end section 26 by a hinge 27. Hinge 25 includes top and bottom discs 28 and 29 attached to middle section 24, but are movable relative to first section 23. A T-bolt 30 is screwed through top disc 28 into first section 23 for securing middle section 24 in the retracted position shown. A notch 31 is provided on disc 28 for mating with a pivoting latch 32 on a side of first section 23 and locking middle section 24 when middle section 24 is pivoted to an extended position (FIG. 6). Hinge 27 includes a top disc 33 and a bottom disc (not shown) attached to end section 26, but are movable relative to middle section 24. A notch 34 is provided on disc 33 for mating with a pivoting latch 35 on a side of middle section 24 and locking end section 26 when end section 26 is pivoted to an extended position (FIG. 6).

Figure 2:
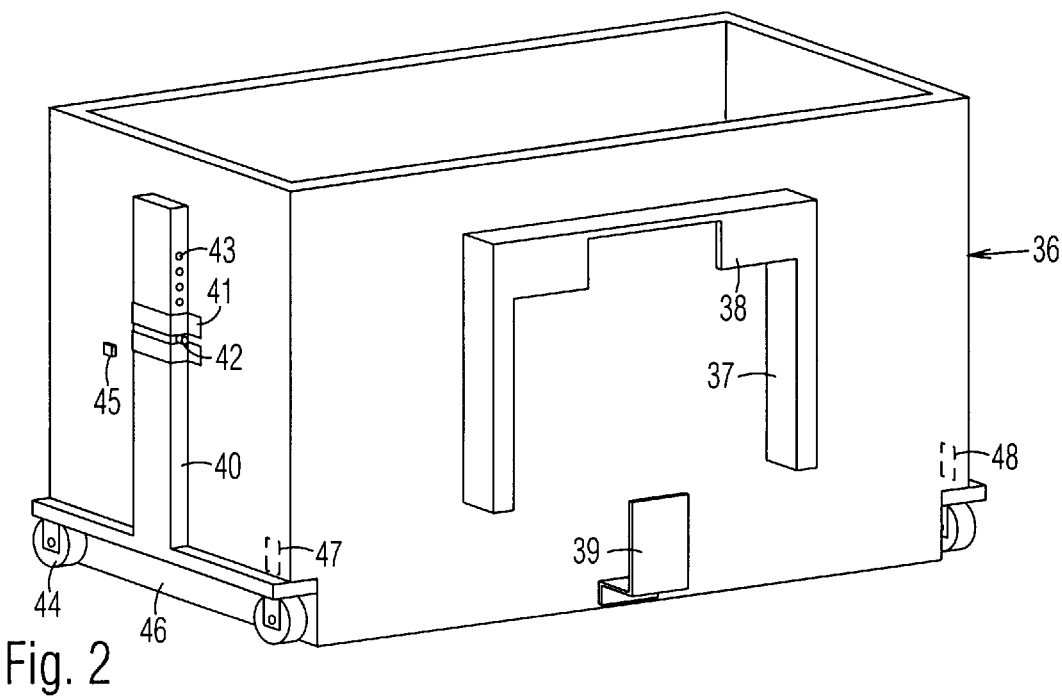
FIG. 2 is a front perspective view of a cargo holder with its legs in a retracted position.
Figure 3:
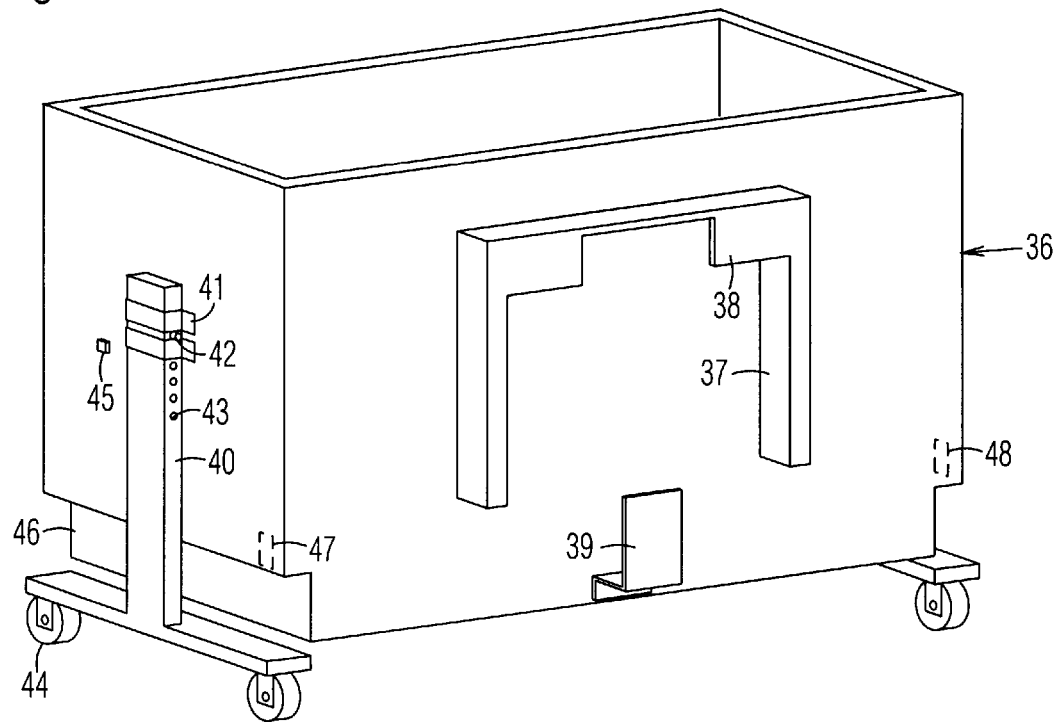
FIG. 3 is a front perspective view of the cargo holder with its legs in an extended position.

FIGS. 2–4:

A cargo holder 36 for the equipment carrier is shown in a front perspective view in FIG. 2. A pair of vertical guide bars 37 are attached to a front side of holder 36. A pair of downwardly directed top mounting brackets 38 are attached to the insides of bars 37. An upwardly directed bottom mounting bracket 39 is attached to the front of holder 36. A pair of legs 40 are attached to opposite sides of holder 36. A vertical portion of each leg 40 is slidable within a pair of brackets 41 mounted in spaced relation on a corresponding side of holder 36. Each leg 40 is movable between a retracted position shown in FIG. 2 and an extended position shown in FIG. 3. A plurality of holes 43 are provided on each leg 40, which can be secured in a plurality of positions for different vehicles by positioning a suitable hole 43 between brackets 41, and inserting pin 42 in hole 43. The spaced brackets 41 enable hole 43 to be easily aligned between them. Wheels 44 attached to the bottom of legs 40 enable holder 36 to be easily transported once it is on the ground, even when heavy objects are carried in cargo holder 36. A pair of lamps 45 (one shown) are mounted on the sides of holder 36 near each pair of brackets 41 for illuminating them and aiding the insertion of pin 42 in the dark. Recessed channels 46 are provided on the lower side edges of holder 36 for receiving the horizontal portions of legs 40, which can be retracted flush with the bottom of holder 36. Sensor switches 47 and 48 are mounted in channels 46 for sensing the retraction of legs 40.

Figure 4:
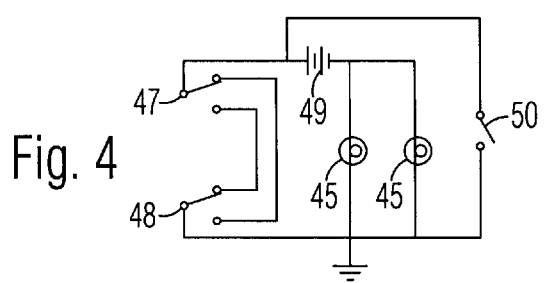
FIG. 4 is a schematic diagram of a lighting circuitry of the cargo holder.

In the circuit diagram shown in FIG. 4, lamps 45 are connected in parallel to a battery 49, which is preferably mounted on the cargo holder. Sensor switches 47 and 48, which are preferably SPDT switches, are connected in series to lamps 45, and a power switch 50 is connected in parallel to sensor switches 47 and 48. Power switch 50 is preferably mounted on the driver's side of cargo holder 36, and is turned off in daylight. Lamps 45 are deactivated when leg 40 are both retracted or both extended, and activated when either leg is extended and the other retracted. Power switch 50 can be used to turn on lamps 45 when legs 40 are both extended or both retracted for illuminating brackets 41 at night, so that pins 42 can be inserted more easily.

FIGS. 5–6:

Equipment carrier 58 is shown in a top sectional view in FIG. 5 in a stowed position. End section 26 of arm 10 is perpendicular to middle section 24. A connecting member 51 extending perpendicularly from the proximal end of first section 23 is secured in trailer hitch 11. A key 52 extending from the inner side of end section 26 is positioned in a hole 53 in first section 23 for aligning end section 26 with the proximal end of first section 23. A rubber bumper 54 is attached to the inner side of end section 26 for engaging first section 23. A tab 55 attached to end section 26 has a horizontal slot 56 detachably mated with a pin 57 extending from the proximal end of first section 23 for securing end section 26 in the stowed position.

As shown in FIG. 6, the equipment carrier is extendable for enabling access to the tailgate or rear door of the vehicle. It is extended by removing T-bolt 30 (FIG. 1), pivoting middle section 24 counterclockwise until latch 32 is engaged in notch 31 on disc 28, and pivoting end section 26 clockwise until latch 35 is engaged in notch 34 on disc 33.

Figure 7:
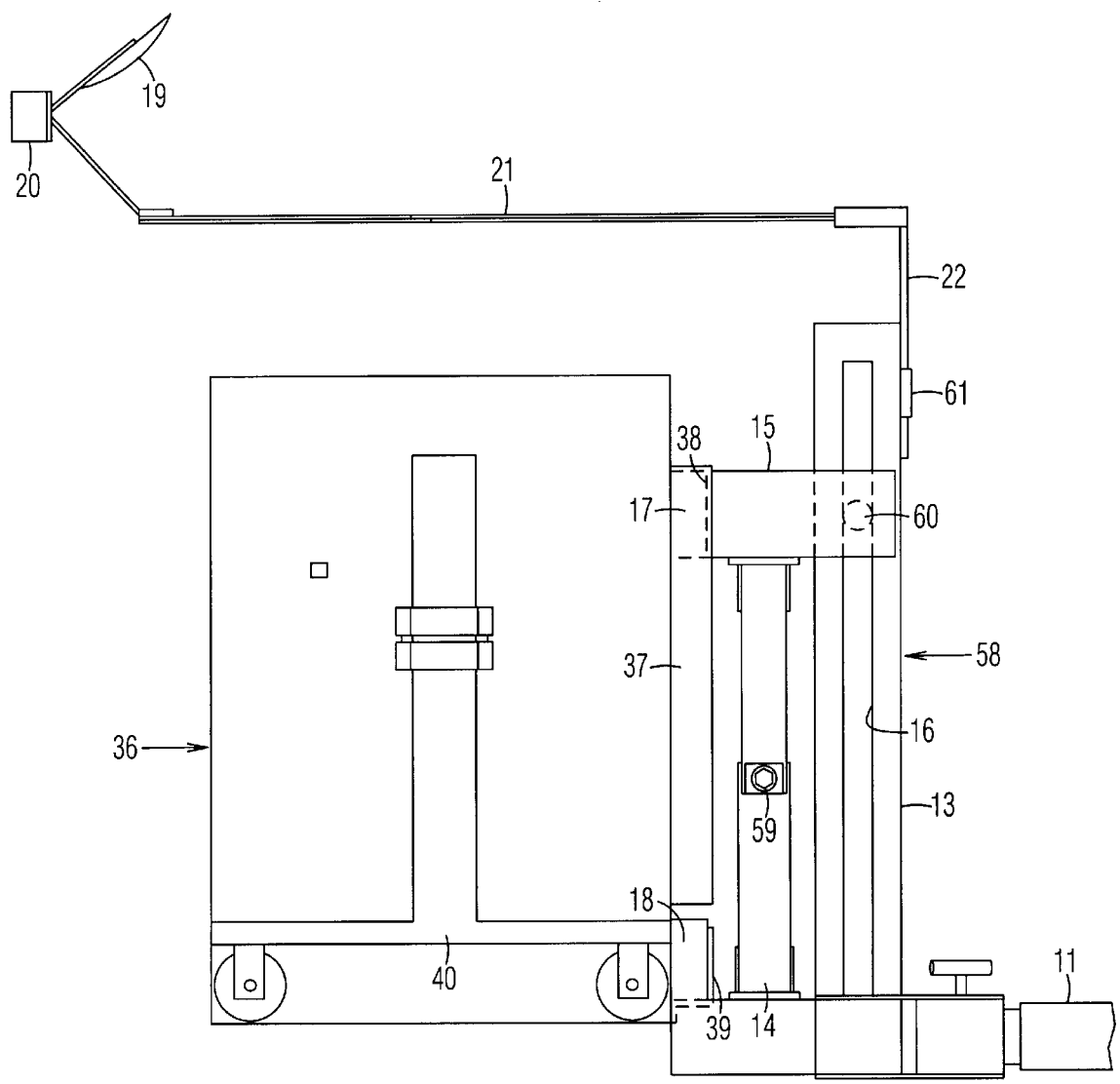
FIG. 7 is a right side view of the equipment carrier with the cargo holder attached.

FIGS. 7–8:

Equipment carrier 58 is shown in a stowed and raised position in a right side view in FIG. 7. Legs 40 (one shown) are in a retracted position. Cargo holder 36 is attached to equipment carrier 58 when jack 14 is in a fully lowered position, so that cargo holder 36 does not have to be lifted onto it. Cargo holder 36 is attached by positioning top support member 17 between guide bars 37 (one shown) and behind mounting brackets 38 (one shown), and operating jack 14 with a hand crank (not shown) inserted into a socket 59, until bottom mounting bracket 39 is engaged under bottom support member 18, and cargo holder 36 is raised to the position shown.

Although jack 14 is very inexpensive, it is powerful enough to easily lift cargo holder 36 even when heavy objects are carried therein. The top of jack 14 is guided along a vertical direction by rollers 60 (one shown) attached to the insides of arms 15 (one shown) and positioned in slots 16 of guide rail 13. Space is conserved by moving cargo holder 36 in a purely vertical direction, so that it can be lifted and lowered even when the vehicle is parked closely in front of another vehicle.

Figure 8:
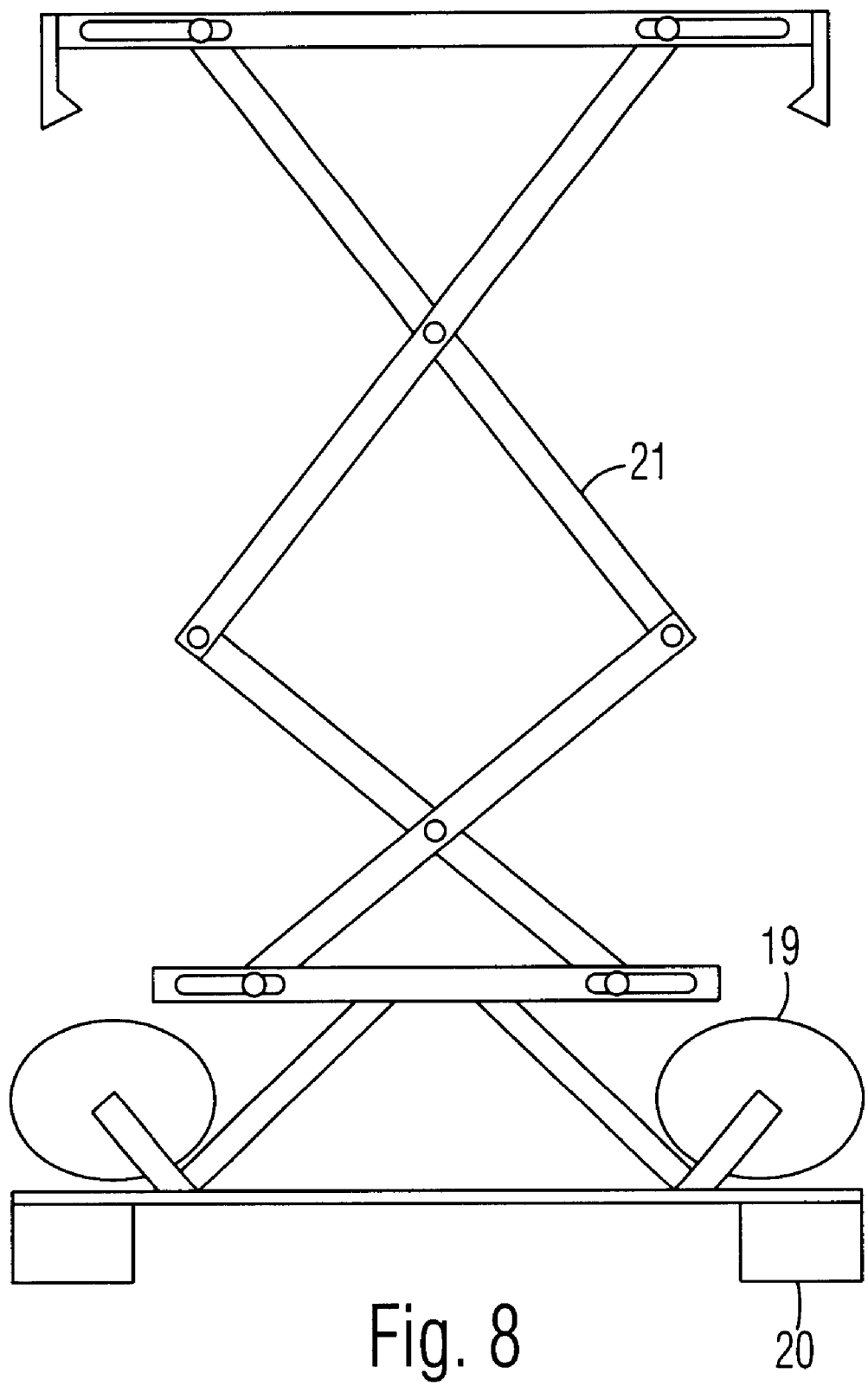
FIG. 8 is a top view of a rear view mirror and brake light assembly in an extended position.

Arm 21 is fully extended to the position shown, so that mirrors 19 (one shown) enable the driver to see behind and below cargo holder 36 when backing up. Arm 21 can be adjusted up and down for aligning with the rear window of the vehicle by sliding post 22 in a bracket 61 attached to guide rail 13. Arm 21 is shown in a top view in FIG. 8 in the extended position. The rest of equipment carrier 58 is not shown in FIG. 8.

Figure 9:
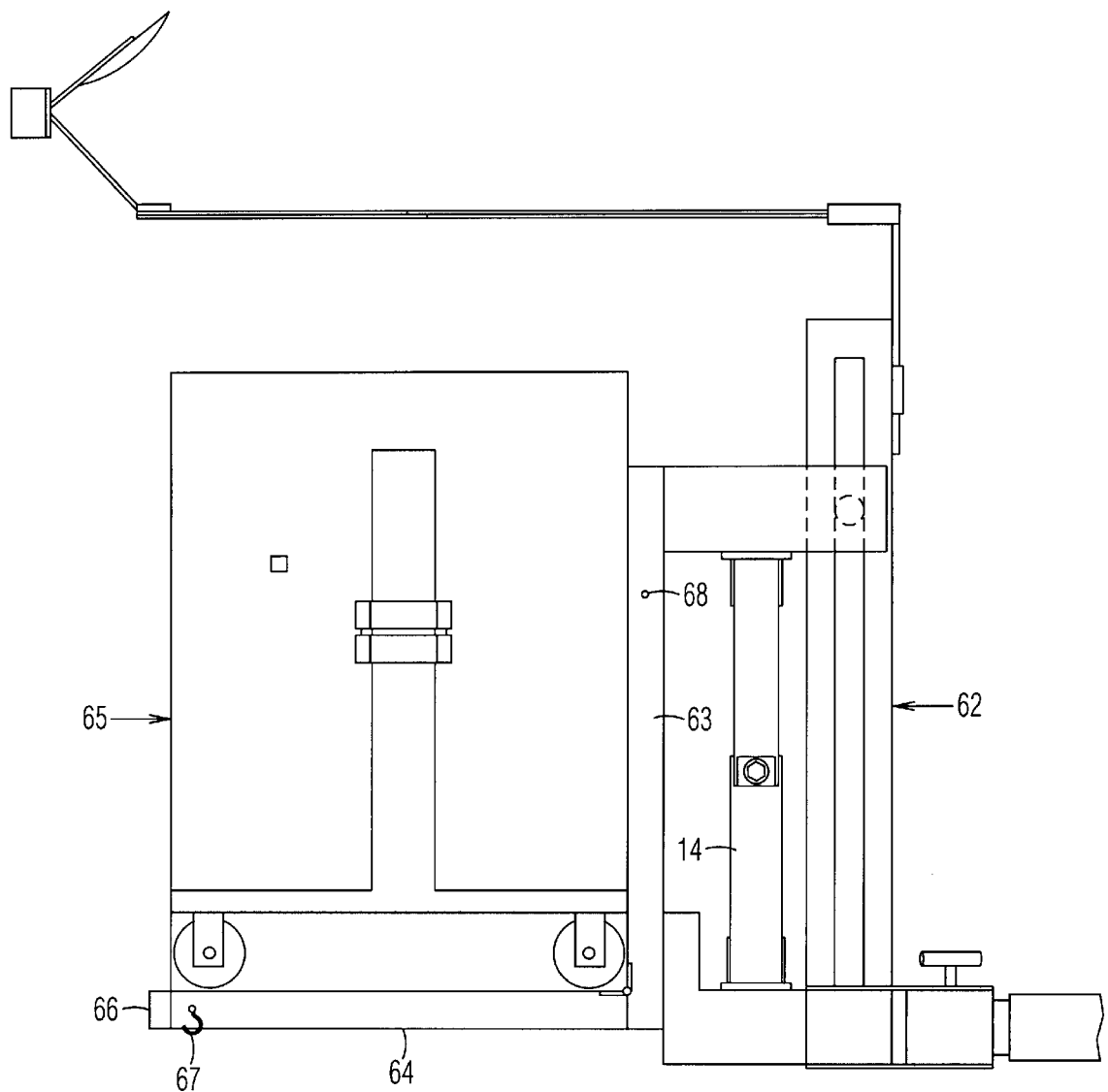
FIG. 9 is a second embodiment of the equipment carrier.

FIG. 9:

A second embodiment of an equipment carrier 62 is shown in a right side view in FIG. 9. It is the same as the embodiment shown in FIG. 1, except for a vertical member 63 extending downwardly from the top of jack 14, and a platform 64 hinged to the lower end of vertical member 63 for supporting a cargo holder 65. A pair of brake lights 66 (one shown) are attached to the rear end of platform 64. A hook 67 attached to a side of platform 64 is arranged to engage a pin 68 on is vertical member 63 for securing platform 64 in a retracted position when cargo holder 65 is removed.

Figure 10:
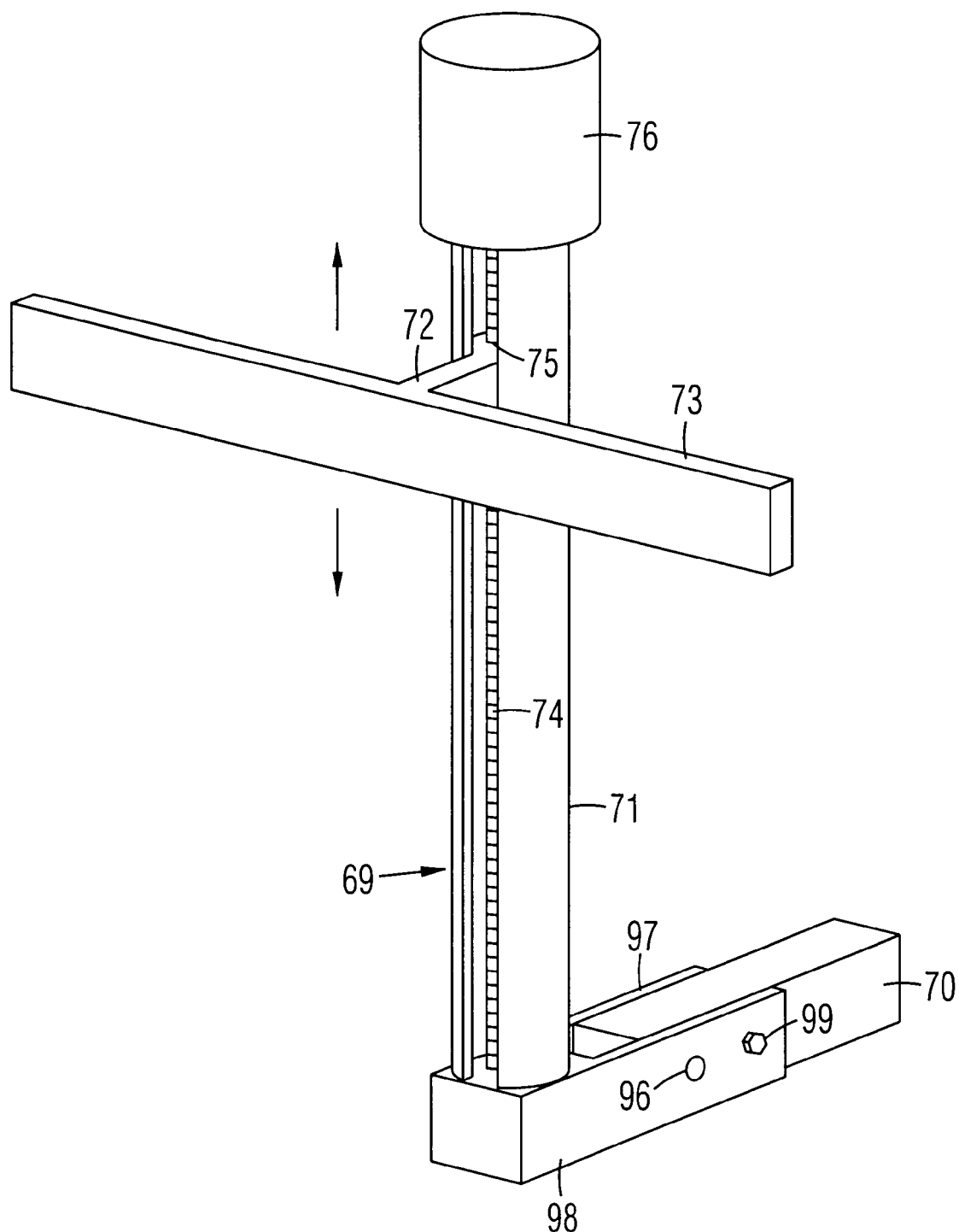
FIG. 10 is air perspective view of a third embodiment of the equipment carrier.

FIG. 10:

A third embodiment of an equipment carrier 69 is shown in a rear perspective view in FIG. 10. It includes an articulated arm 70 for connecting to a trailer hitch. Alternatively, arm 70 may include additional articulation such as in the first embodiment shown in FIG. 1. A screw jack 71 is connected to a rear end 98 of arm 70, and includes a screw shaft 74 screwed into a hole 75 in a runner 72, and a motor 76 connected to the top end, or alternatively, the bottom end, of screw shaft 74. A horizontal support member 73 is attached to the outer end of runner 72 for supporting a cargo holder and moving it vertically when screw shaft 74 is turned by motor 76. Arm 70 is articulated with a pivot 96 between a pair of parallel brackets 97 extending forward from a rear section 98. Alternatively, pivot 96 may be attached directly to screw jack 71. When a latch or bolt 99 extending through brackets 97 and arm 70 is removed, rear section 98 and screw jack 71 can be pivoted backward and lowered to allow the opening of a rear door on the vehicle.

Figure 11:
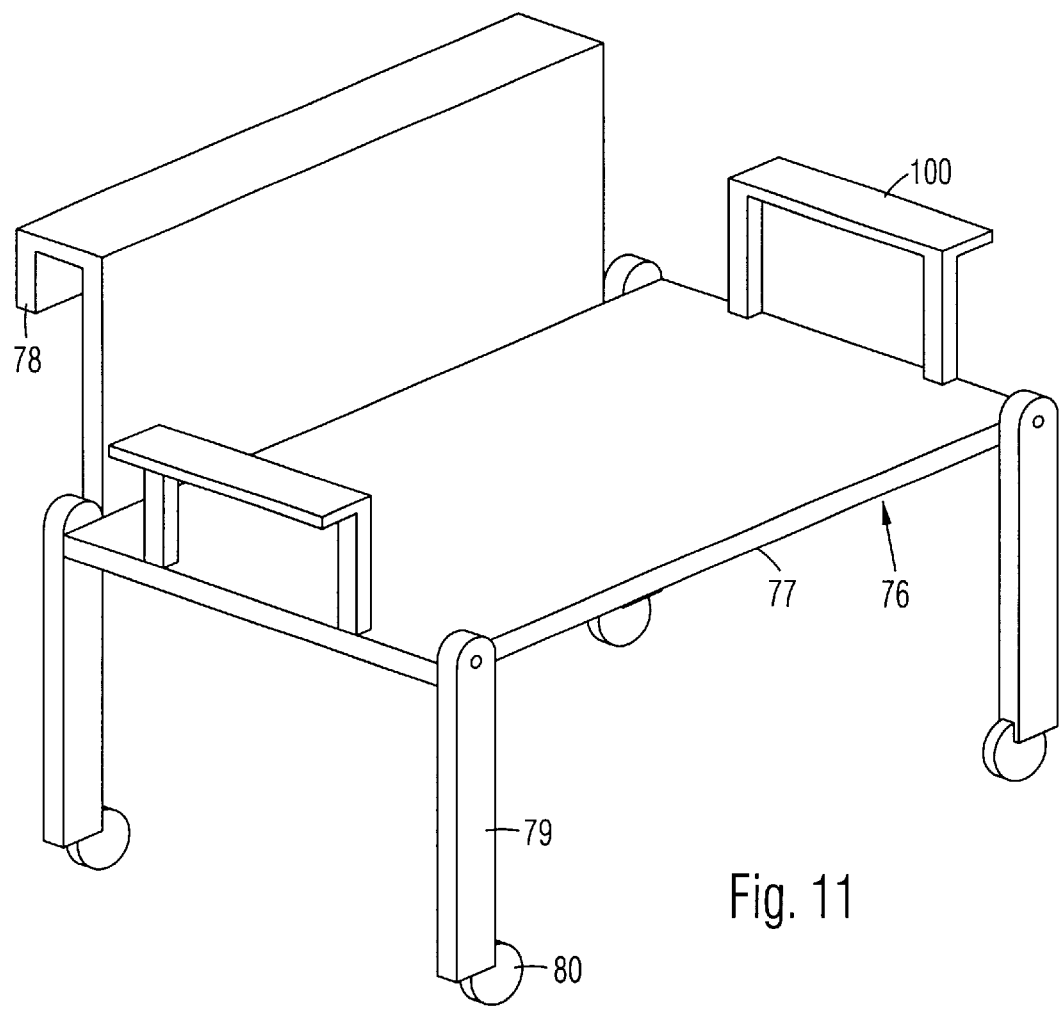
FIG. 11 is a rear perspective view of a second embodiment of a cargo holder in an expanded position.
Figure 12:
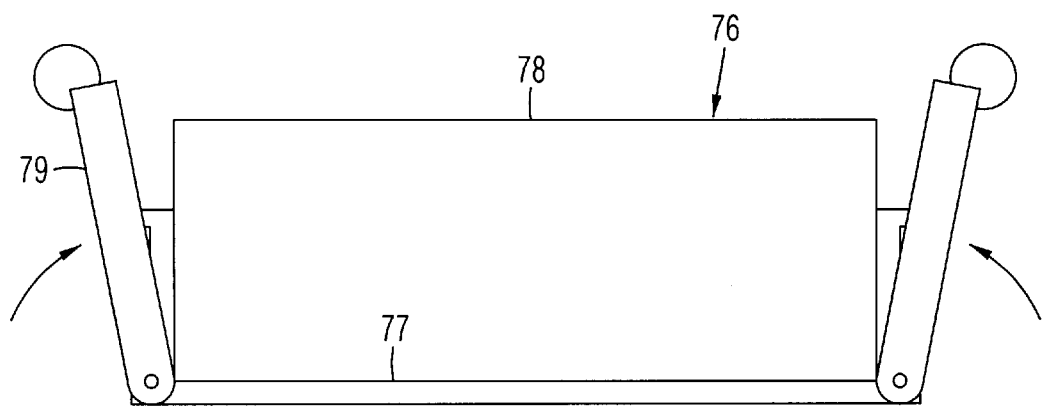
FIG. 12 is a rear view of the cargo holder of FIG. 11 in a compacted position.

FIGS. 11–12:

A second embodiment of a cargo holder 76 is shown in a rear perspective view in FIG. 11. It includes a generally rectangular support platform 77 with a connector 78 at a front thereof for removably attaching to the horizontal support member of the equipment carrier (FIG. 1). Connector 78 is preferably an inverted hook. Alternatively, side walls may be attached to platform 77 to form a cargo box. Hook 78 is projected substantially above platform 77, and extending generally across an entire wide of platform 77. Legs 79 are pivoted to the corners of platform 77. Casters 80 at the lower end of legs 79 allow cargo holder 76 to be rolled about on the ground when detached from the equipment carrier. Handles 100 are attached to opposite sides of platform 77. When cargo holder 76 is supported on the equipment carrier (not shown), legs 79 are folded upward, as shown in the rear view in FIG. 12. Alternatively, legs 79 may fold to a parallel position with platform 77 generally no lower than said platform, such as flat underneath the platform. Also alternatively, the legs may retract by sliding vertically, such as shown in FIG. 2.

SUMMARY AND SCOPE

Accordingly, an external equipment carrier with a cargo holder for a vehicle is provided. It can carry a large and heavy cargo holder outside the vehicle. It can lower and raise the cargo holder very easily onto and off the ground. It is movable away from the rear of the vehicle to provide access to the tailgate or rear door. It enables a driver to see behind and below the cargo holder when backing up. It is compact, so that no extra space is needed for loading and unloading the cargo holder when the vehicle is parked in front of another vehicle. The cargo holder can be easily transported once it is on the ground. It is also inexpensive.

Although the above description is specific, it should not be considered as a limitation on the scope of the invention, but only as an example of the preferred embodiment. Many substitutes and variations are possible within the teachings of the invention. For example, hinge 27 may be eliminated, so that end section 26 is fixedly attached to middle section 24. All hinges in arm 10 may be eliminated, and arm 10 substantially shortened, so that guide rail 13 and jack 14 are not pivotable away from the rear of the vehicle, which may be acceptable if access to the rear of the vehicle is unnecessary. Guide rail 13 may be of any other form. Equipment carrier 58 can be used to carry other equipment instead of a cargo holder, such as but not limited to bicycles, wheelchairs, scooters, etc. Top support member 17 may be of any suitable form for supporting such other equipment. Arm 10 can be arranged on the left side of the vehicle as a mirror image of the embodiment shown. Therefore, the scope of the invention should be determined by the appended claims and their legal equivalents, not by the examples given.

I claim:

1. A cargo holder for a vehicle, comprising:
    an external equipment carrier comprising a jack for attaching to a rear of said vehicle, and a horizontal support member on said jack, wherein said horizontal support member is moved in a vertical direction when said jack is operated;
    a horizontal platform;
    a connector comprising a hook at a front of said platform, wherein said connector is removably engaged on said support member of said external equipment carrier;

a plurality of folding legs pivotally attached to said platform and rotatable between an extended position projecting down from said platform, and a retracted position proximally adjacent to said platform, wherein said platform is supported by said legs in said extended position when said cargo holder is detached from said support member and positioned on a ground surface, said legs are retracted when said cargo holder is supported on said supported member; and a plurality of casters attached to corresponding ones of said legs, said casters enabling said cargo holder to be easily moved about when on said ground surface.

* * * * *